United States Patent
Lyle et al.

(10) Patent No.: US 6,981,155 B1
(45) Date of Patent: Dec. 27, 2005

(54) SYSTEM AND METHOD FOR COMPUTER SECURITY

(75) Inventors: Michael P. Lyle, San Jose, CA (US); Robert F. Ross, Mountain View, CA (US); James R. Maricondo, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 894 days.

(21) Appl. No.: 09/615,967

(22) Filed: Jul. 14, 2000

Related U.S. Application Data

(60) Provisional application No. 60/143,821, filed on Jul. 14, 1999, provisional application No. 60/151,531, filed on Aug. 30, 1999.

(51) Int. Cl.[7] .......................... G06F 9/44; G06F 11/30; G06F 12/14
(52) U.S. Cl. .......................... 713/201; 703/21; 707/10; 713/200
(58) Field of Search .......................... 71/153, 154, 200, 71/201; 703/21; 707/10

(56) References Cited

U.S. PATENT DOCUMENTS

| | | | |
|---|---|---|---|
| 4,719,566 A * | 1/1988 | Kelley .......................... 340/5.27 |
| 5,842,002 A * | 11/1998 | Schnurer et al. .............. 703/21 |
| 5,870,550 A * | 2/1999 | Wesinger et al. ........... 709/218 |
| 5,913,024 A * | 6/1999 | Green et al. ................. 713/200 |
| 5,925,126 A * | 7/1999 | Hsieh .......................... 713/200 |
| 6,079,020 A | 6/2000 | Liu ............................. 713/201 |
| 6,321,338 B1 | 11/2001 | Porras et al. |
| 6,389,458 B2 * | 5/2002 | Shuster ....................... 709/213 |
| 6,408,391 B1 * | 6/2002 | Huff et al. ................... 713/201 |
| 6,484,203 B1 | 11/2002 | Porras et al. |
| 6,567,808 B1 * | 5/2003 | Eschelbeck et al. .......... 707/10 |
| 6,687,833 B1 * | 2/2004 | Osborne et al. ............. 713/201 |
| 6,704,874 B1 | 3/2004 | Porras et al. |
| 6,708,212 B2 | 3/2004 | Porras et al. |
| 6,711,615 B2 | 3/2004 | Porras et al. |

OTHER PUBLICATIONS

Cheswick, "An Evening with Berferd," 1995.*
Cohen, "Operating System Protection Through Program Evolution," 1998.*
"Deception Toolkit", 1999.*
Spitzner, "To Build a Honeypot," 1999.*

* cited by examiner

*Primary Examiner*—Gregory Morse
*Assistant Examiner*—Matthew Heneghan
(74) *Attorney, Agent, or Firm*—Van Pelt, Yi & James LLP

(57) ABSTRACT

A system and method are disclosed for providing security for a computer network. Content is generated for a computer associated with the network. It is determined whether a user should be routed to the generated content. If it is determined that the user should be routed to the generated content, the user is so routed.

18 Claims, 15 Drawing Sheets

SYSTEM AND METHOD FOR COMPUTER SECURITY

CROSS REFERENCE TO RELATED APPLICATIONS

This application claims priority to U.S. Provisional Patent Application No. 60/143,821 entitled "SYSTEM AND METHOD FOR COMPUTER SECURITY" filed Jul. 14, 1999, which is incorporated herein by reference for all purposes, and U.S. Provisional Patent Application No. 60/151,531 entitled "SYSTEM AND METHOD FOR PROVIDING COMPUTER SECURITY" filed Aug. 30, 1999, which is incorporated herein by reference for all purposes.

This application is related to co-pending U.S. patent application Ser. No. 09/616,805 entitled SYSTEM AND METHOD FOR GENERATING fictitious CONTENT FOR A COMPUTER filed concurrently herewith, which is incorporated herein by reference for all purposes; and co-pending U.S. patent application Ser. No. 09/615,891 entitled SYSTEM AND METHOD FOR PREVENTING DETECTION OF A SELECTED PROCESS RUNNING ON A COMPUTER filed concurrently herewith, which is incorporated herein by reference for all purposes; and co-pending U.S. patent application Ser. No. 09/616,469 entitled SYSTEM AND METHOD FOR PREVENTING DETECTION OF A COMPUTER CONNECTION TO AN EXTERNAL DEVICE filed concurrently herewith, which is incorporated herein by reference for all purposes.

FIELD OF THE INVENTION

The present invention relates generally to computers. More specifically, a system and method for computer security is disclosed.

BACKGROUND OF THE INVENTION

Computers and networks of computers, such as local area networks (LAN) and wide area networks (WAN), are used by many businesses and other organizations to enable employees and other authorized users to access information, create and edit files, and communicate with one another, such as by e-mail, among other uses. Often, such networks are connected or are capable of being connected to computers that are not part of the network, such as by modem or via the Internet. In such cases, the network becomes vulnerable to attacks by unauthorized users, such as so-called computer "hackers", who may be able to gain unauthorized access to files stored on network computers by using ports or connections provided to connect the network to computers outside of the network.

One known technique for foiling an attacker seeking to gain unauthorized access to a computer or computer network is a so-called "honey pot." A honey pot, in computer security parlance, is a computer system containing a set of files that are designed to lure a computer hacker or other attacker to access the files, such as by making it seem like the files are particularly important or interesting. Since the honey pot files are typically not actually working files, any activity in the honey pot files is suspicious and an attempt is made to identify and locate any user who accesses or attempts to access the files.

The major shortcoming of the honey pot approach is that by the time the attacker has accessed the honey pot files, the attacker has already gained access to the computer containing the files. The attacker also has access to other files on the same computer, and may be able to access other computers in the same computer network. There is typically no mechanism for restricting the hacker to viewing only the honey pot files.

A second known approach is to provide a deception server. A deception server contains false data. A router or firewall is configured to route suspected attackers to the deception server instead of permitting the suspected attacker to access the real computer system or network.

The major shortcoming of prior art deception servers is that it is relatively easy for attackers to discover they are in a deception server. Among other things, prior art deception servers cannot make it appear to an attacker that the attacker has been allowed on the actual computer or computer network. In addition, deception servers have only a limited number of files, with the result that it is relatively easy to determine that a deception server does not contain the full array of files typically found in a true server, such as a typical business network computer server.

As a result, there is a need for a way to deceive attackers into believing they have gained access to a true computer system, without actually allowing them to gain access to true files. In addition, there is a need for a way to monitor such attackers, without their knowing, to facilitate efforts to improve security measures and identify attackers.

SUMMARY OF THE INVENTION

Accordingly, a system and method for computer security is disclosed.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, content is generated for a computer associated with a network. It is determined whether a user should be routed to the generated content. If it is determined that the user should be routed to the generated content, the user is so routed.

In one embodiment, content is generated for a file system for a first computer associated with a network. A directory is created within the first computer. The file system of the first computer is copied into the directory. A user who attempts to gain unauthorized access to a second computer associated with the network is routed to the directory in the first computer.

Providing a virtual computer environment for test purposes also is disclosed. In one embodiment, a directory is created within a computer. The file system of the computer is copied into the directory. A configuration change is implemented within the copy of the file system in the directory.

A system for providing security for a computer network is disclosed. The system comprises a computer configured to generate content for the computer, which computer is associated with the network. The system also comprises a network device configured to determine whether a user should be routed to the generated content and to route the user to the generated content if it is determined that the user should be routed to the generated content.

A computer computer program product for providing security for a computer network is disclosed. The computer program product is embodied in a computer readable medium and comprises computer instructions for generating content for a computer, which computer is associated with the network; determining whether a user should be routed to the generated content; and routing the user to the generated content if it is determined that the user should be routed to the generated content.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
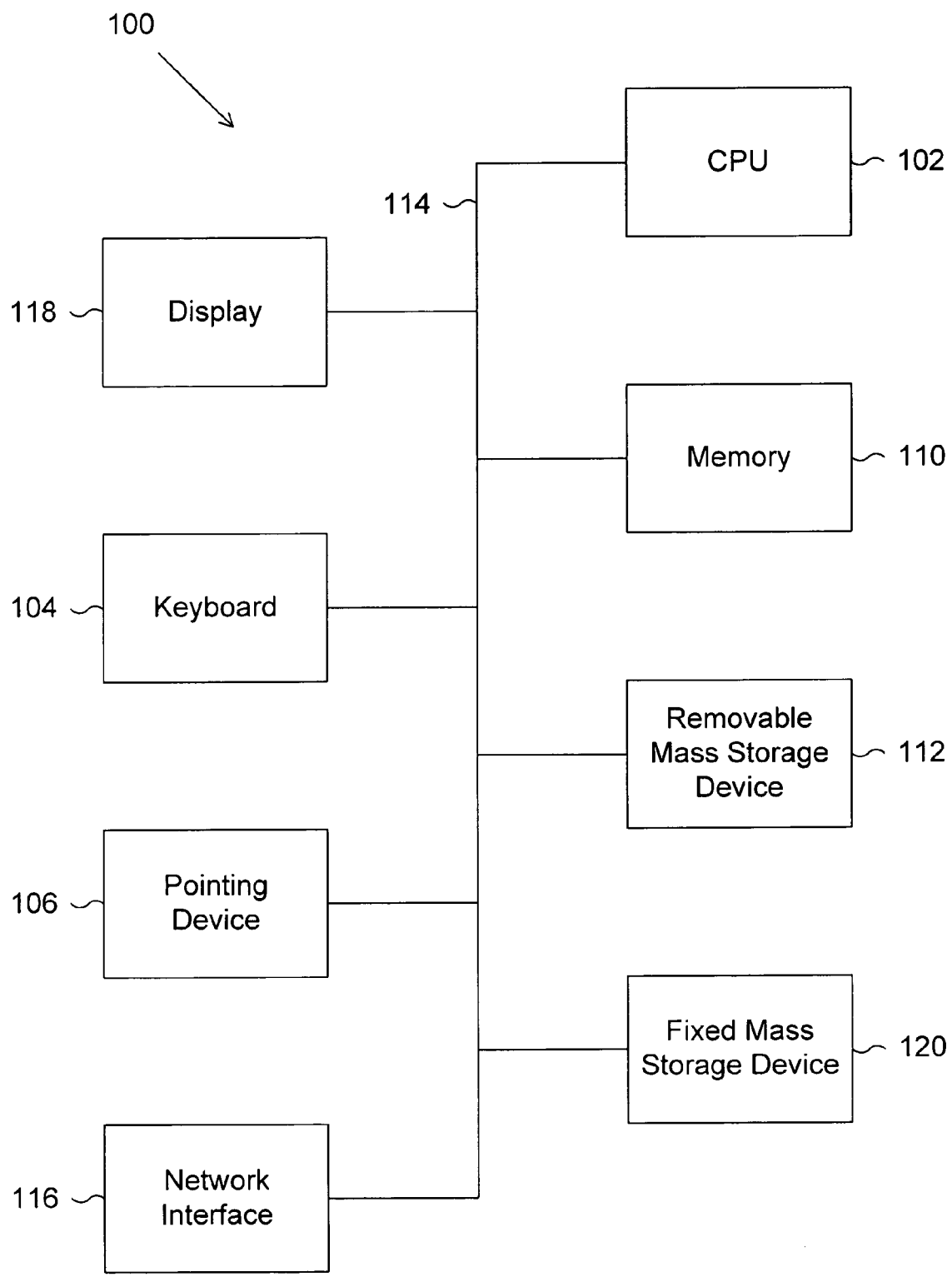
FIG. 1 is a block diagram of a general purpose computer system 100 suitable for carrying out the processing in accordance with one embodiment of the present invention.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or unidirectional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 2:
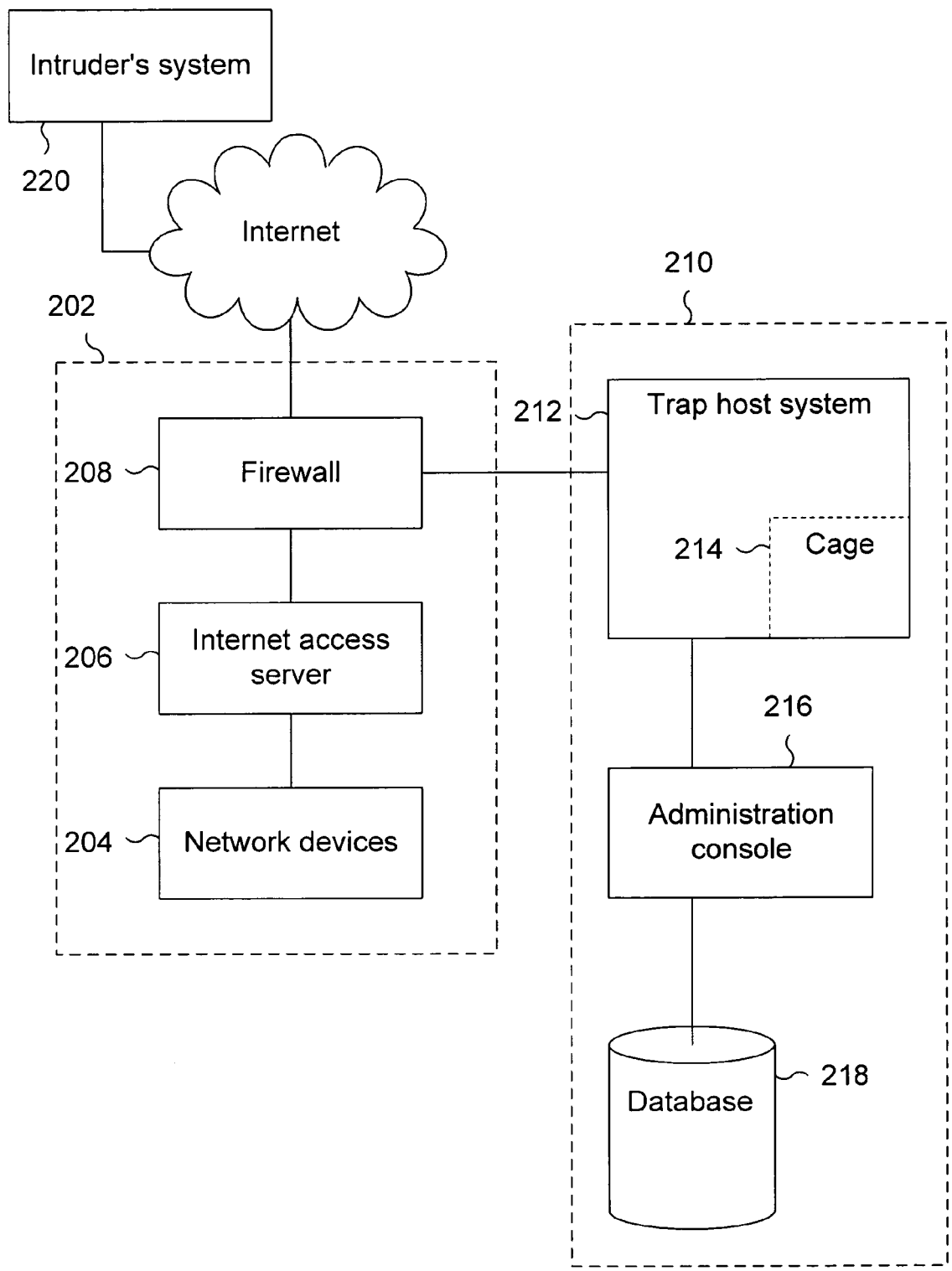
FIG. 2 is a schematic diagram of a system used in one embodiment to provide computer security.

FIG. 2 is a schematic diagram of a system used in one embodiment to provide computer security. The system includes a computer network 202 to which the operator of the computer network wishes to limit access to authorized users. Computer network 202 is comprised of a plurality of network devices 204. The plurality of network devices 204 may include, for example, individual computer work stations, network servers, printers, and any number of other devices such as may be found in a typical computer network, such as a local area network (LAN) or wide area network (WAN). Computer network 202 also includes a Internet access server 206 configured to enable users of host computer systems connected to the computer network 202 to access the Internet and in particular to access web pages via the World Wide Web by sending and receiving hypertext transfer protocol (HTTP) transmissions. Computer network 202 also includes a firewall 208 interposed between Internet access server 206 and the network connection to the Internet. Firewall 208 may be either a firewall, or a router with firewall functionality, configured to route authorized users to Internet access server 206 and to detect and route unauthorized users to the trap system described below.

The system shown in FIG. 2 also includes a trap system 210. Trap system 210 is comprised of a trap host system 212 in which a virtual cage 214 is established, as described below. Trap system 210 also includes an administration console 216 connected to trap host system 212 and configured to enable a system administrator (or other authorized user) to control the configuration of trap host system 212 and virtual cage 214. Trap system 210 also includes a database 218 used to store data relating to activities within trap host system 212 and virtual cage 214.

The system shown in FIG. 2 is designed to protect the computer network 202 from being accessed or otherwise compromised by an intruder who is attempting to gain access to computer network 202 via the Internet. FIG. 2 shows an exemplary intruder's system 220 such as might be used by a would-be intruder to attempt to gain access to the computer network 202 via the Internet.

Figure 3:
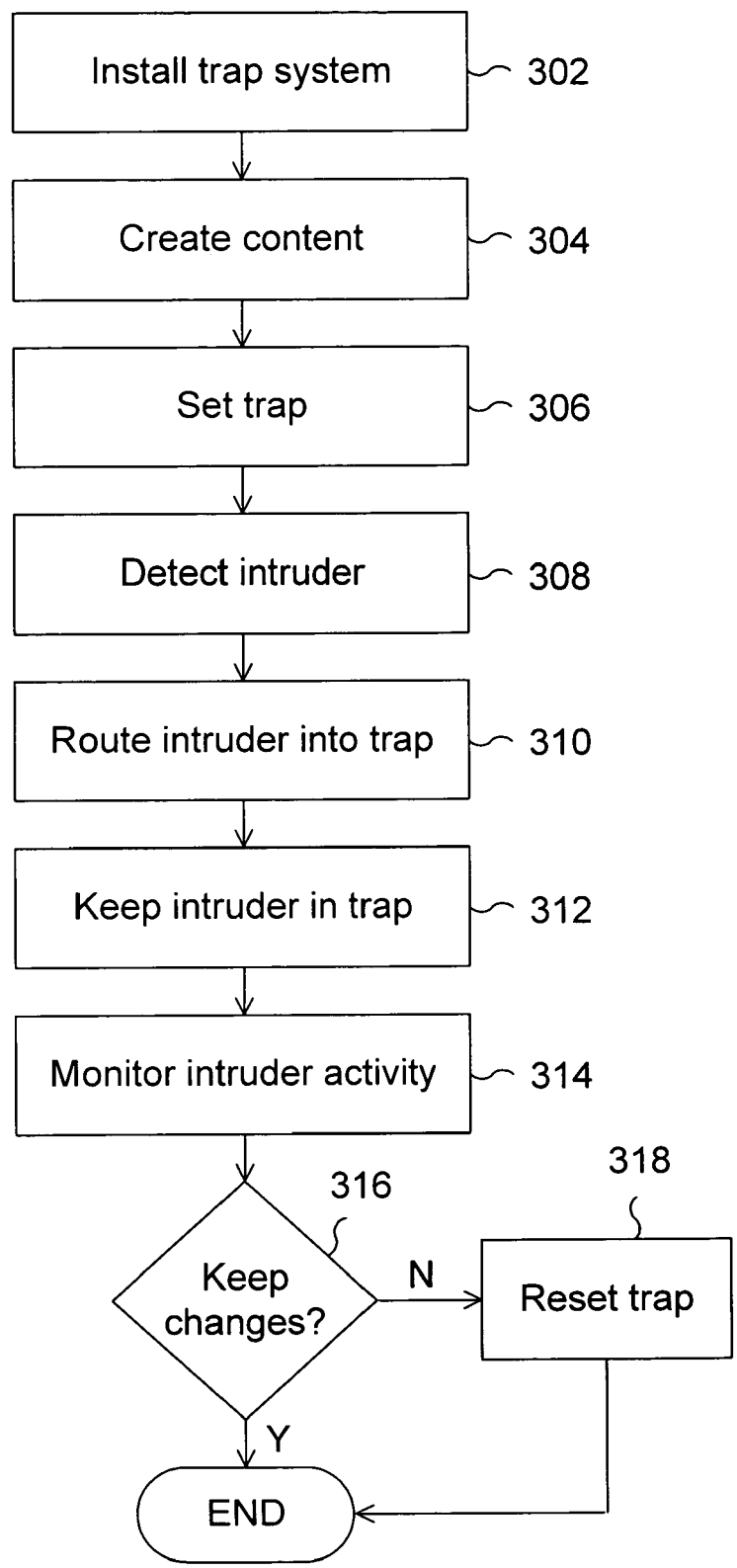
FIG. 3 is a flow chart illustrating a process used in one embodiment to provide computer security using a trap system such as trap system 210 of FIG. 2.

FIG. 3 is a flow chart illustrating a process used in one embodiment to provide computer security using a trap system such as trap system 210 of FIG. 2. The process begins with step 302 in which a trap system such as trap system 210 of FIG. 2 is installed. In step 304, the file content for a deception environment to be presented to would-be intruders is created. Examples of the content of the deception environment include fictitious content generated automatically as described below; non-confidential (i.e., public) files drawn from the computer network being protected, such as computer network 202 of FIG. 2; or a combination of fictitious and non-confidential file content.

In step 306, a trap is established within the trap system. For example, a virtual cage such as virtual cage 214, shown in FIG. 2 may be established within a trap host system, such as trap host system 212 of FIG. 2, by establishing a file directory for the cage and copying the operating system of the trap host system—but not the modifications and additions to the operating system described below that function to monitor the intruder's actions, keep the intruder in the cage, and prevent the intruder from detecting that the intruder is in the cage—and the file system of the trap host system into the directory.

In step 308, a would-be intruder is detected, as described more fully below. In step 310, the would-be intruder is routed into the trap system, such as trap system 210 of FIG. 2, as described more fully below. Once the intruder has been routed into the trap, in step 312 affirmative efforts can be made to ensure that the intruder does not break out of the trap system and gain access to the portions of computer network 202 that are being protected from unauthorized access. In step 314, the activity of the intruder within the trap system is monitored, as described more fully below.

Once the activity of the intruder has ceased, either because the intruder has discontinued the attempt to access computer network 202 or because the system administrator has terminated the intruder's connection with the system, it is determined in step 316 whether the changes to the configuration to the trap system that were made by the intruder during the attack will be kept in place. For example, a system administrator might wish to leave changes made by an intruder in place if the system administrator believes the same intruder may attempt a future attack and might realize that he or she has been routed into a deception environment, as opposed to gaining access to the true computer network, if the changes made by the intruder in the prior attack were not still present. If it is determined in step 316 that the changes will be kept, the process shown in FIG. 3 ends and the trap remains in place, as modified by the intruder, unless or until a future intruder is routed into the trap or the trap is reset. If it is determined in step 316 that the changes made by a particular intruder will not be kept, the process proceeds to step 318 in which the trap is reset to eliminate the changes made by the intruder. In one embodiment, the trap is reset by regenerating the trap to restore the trap environment to the condition it was in at the time the intruder was first routed into the trap. In one embodiment, additional content is added when the trap is regenerated to make it appear that additional content was created by users of the computer network during the time period from the last update of the trap to the time the trap was reset.

Figure 4:
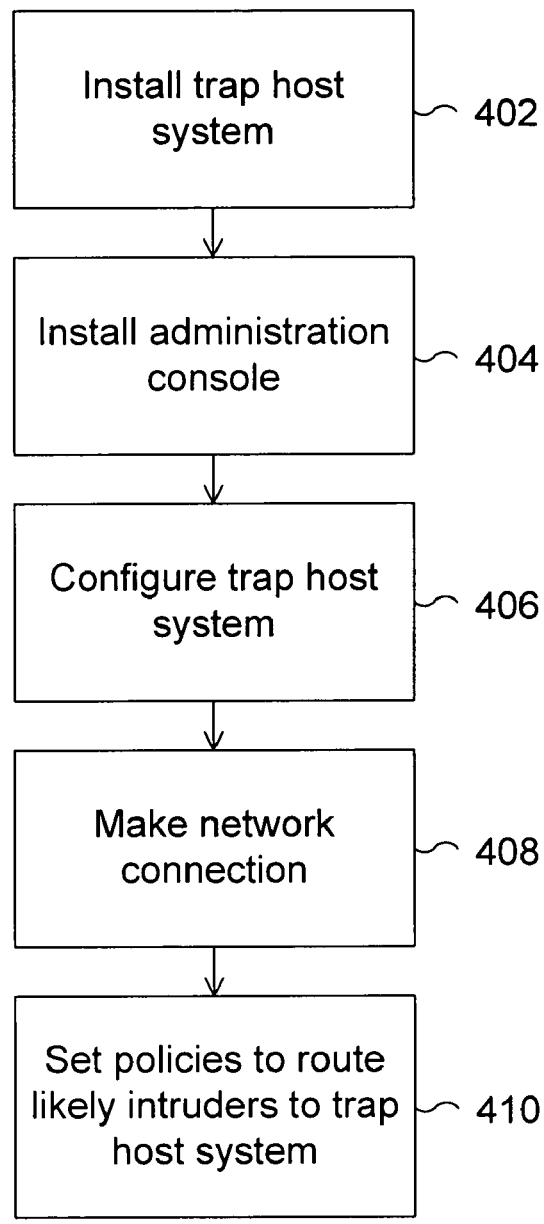
FIG. 4 is a flowchart illustrating a process used in one embodiment to install a trap system, as in step 302 of FIG. 3.

FIG. 4 is a flowchart illustrating a process used in one embodiment to install a trap system, as in step 302 of FIG. 3. The process begins with step 402 in which a trap host system is installed. In one embodiment, the trap host system is a computer, such as an Intel or SPARC computer, running the SOLARIS 7 operating system. In one embodiment, application programs that the user of the trap system wishes to have appear in the deception environment may be installed in the trap host system prior to the installation of the trap system software and the establishment of the virtual cage environment into which the operating system and file system of the trap host system will be copied. In one embodiment, probabilistic data combined with random number data from a pseudo random number generator are used to determine which application programs will appear in the deception environment. In one embodiment, the nature of the business or other organization that uses the computer network influences which application programs are selected. For example, a financial institution may have different application programs, and different types of files, than a law firm.

In step 404, an administration console, such as administration console 216 of FIG. 2, is installed. The administration console is a second computer system connected to the trap host system. The administration console is used to configure and control the operation of the trap host system.

In addition, the administration console receives logging information from the trap host system concerning the activities of the intruder within the trap host system. In one embodiment, administration console 216 is a computer system running either a UNIX or a Windows operating system. The administration console uses its connection to the trap host system to retrieve log and configuration information for the purpose of displaying the information to the system administrator.

In step 406, the trap host system is configured. As noted above, the administration console 216 is used to select configuration options for the trap software, once the trap software has been installed in the trap host system. In one embodiment, upon installation, the trap software automatically configures the trap host system in accordance with the preferences selected by the system administrator or other authorized user of the system by means of the administration console and randomly generated variations in certain system settings, as described more fully below.

The process shown in FIG. 4 continues with step 408 in which a network connection is made between the trap system and the router or firewall used in the computer network being protected to detect and route would-be intruders into the trap system. In one embodiment, network connections are made between the trap host system and the router or firewall for all or selected ones of the remote access services that an intruder might use to attempt to gain unauthorized access to, or control over, a target computer or computer network. In one embodiment, the trap host system operating system is the SOLARIS 7 operating system and the remote access services for which a network connection is established include FTP (file transfer protocol), telnet, and/or other services considered to be in the so-called "demilitarized zone", or "DMZ", of the network being protected.

In step 410, the policy editor of the router or firewall, which is typically provided as part of the software associated with a router or firewall, is used to establish policies which will route likely intruders to the trap host system. Such policies may include, where supported by the particular router or firewall being used, a policy that attempts to gain access to the computer network via a port or service not normally used by the computer network, but known to be exploited by hackers and other intruders to gain access to computer networks, such as the FTP and telnet ports, for example, can be routed to the corresponding port of the trap host system. In one embodiment, a would-be intruder is permitted to see the devices behind the router or firewall. If the would-be intruder seeks to gain access to the virtual cage environment, which can be configured to appear to be an interesting and easy target for intrusion (e.g. because services that are known to be exploitable to gain unauthorized access or control, such as FTP and telnet, will be available), the router or firewall can be configured in step 410 to route the intruder to the appropriate port of the trap host system using well known network address translation (NAT) techniques. In one embodiment, a would-be intruder cannot see the devices behind the router or firewall and any attempt to access a prohibited service on any network system is routed instead to the trap host system using NAT.

Figure 5:
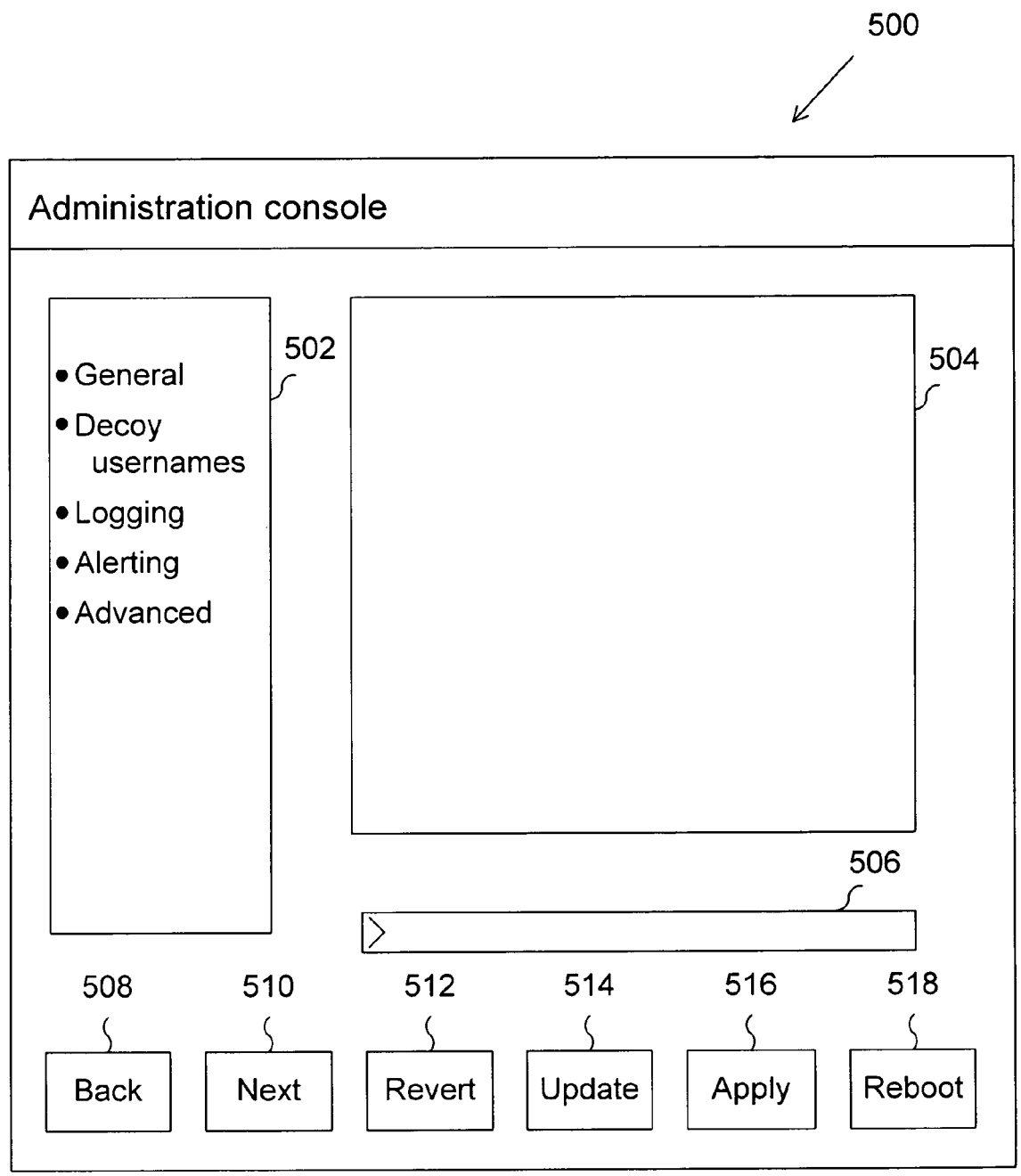
FIG. 5 is an exemplary administration console display 500 used in one embodiment to provide a graphical user interface on the administration console for configuration and control of the trap system.

FIG. 5 is an exemplary administration console display 500 used in one embodiment to provide a graphical user interface on the administration console for configuration and control of the trap system. The administration console display 500 includes a menu display area 502 in which menu choices are displayed. As shown in FIG. 5, in one embodiment, the major headings "General", "Decoy User Names", "Logging", "Alerting", and "Advanced" are displayed in menu display area 502. In one embodiment, selection of a major menu listing results in the subheadings under that menu listing being displayed. Display 500 also includes an instruction display area 504 in which instructions relating to the current menu selection are displayed. Display 500 also includes an input area 506 in which the system administrator or other user either enters data or selects an option from a pick list to provide input with respect to the current menu selection.

In one embodiment, the "General" menu provides options for entering the name of the company using the trap system; entering a license key or serial number for the system; entering a host name to be used in the contents created for the deception environment to identify the host associated with certain content; and to designate a domain name to be used for similar purposes, such as to be included as the domain name for Internet e-mail addresses for the fictitious and other user names used in the e-mail messages generated to be included in the deception environment. In one embodiment, the menu selection "Decoy User Name" enables the system administrator to provide the full name and a login or user name for from one to five individuals. Such an option may be used to provide the name of from one to five prominent and publicly-known individuals associated with the computer system being protected, such as the chief executive officer and/or president of the company that uses the system.

In one embodiment, the menu option labeled "Logging" includes options that enable the system administrator to route logging information from the trap system to a remote logging device, such as by providing the DNS name or IP address of the remote logging server. In addition, the "Logging" menu in one embodiment includes an option to either enable remote logging, as described above, or to disable remote logging and to have the log information spooled only to the trap host system. Finally, the "Logging" menu option in one embodiment includes an option that permits the system administrator to designate the name of the network interface used to gather information on an intruder's network activity, for example for use in later tracing the source of an intruder's attack.

In one embodiment the menu heading "Alerting" provides options for controlling the manner in which alerts regarding intruder activity is provided and the criteria used to determine when such an alert should be sent. The purpose of such an alert is to advise the system administrator that an intruder has gained a certain level of access to or control over the trap system. Providing such an alert enables the system administrator to more closely monitor the intruder and, if necessary, to cut off the intruder's connection to the system. The degree to which an intruder has gained unauthorized access or control is sometimes referred to as the extent to which the security of the system or network has been compromised by the intruder. In one embodiment, the options under the menu heading "Alerting" include the options to designate an e-mail address to be used to provide alerts, a fictitious subject line to be used in such e-mail messages, and an option for selecting an alert threshold.

For example, in one embodiment, one of five alert thresholds may be selected. The lowest threshold provides that no e-mail alert messages will be sent regardless of the type or severity of the compromise achieved by the intruder. A somewhat higher threshold provides for an e-mail alert message to be sent if the trap host computer system experiences a fatal error, for example if the host runs out of disk space. The next higher level provides for an e-mail alert message to be sent in a clear case of compromise such as if a new process has started within the virtual cage environment in the trap host system. The next somewhat higher level of alert provides for an e-mail alert message to be sent in situations that indicate a possible security compromise, such as if multiple port connections are opened by an intruder in an attempt to determine which processes are currently running on the host system. The most sensitive and final level of alert provides for an e-mail alert message to be sent whenever the virtual cage environment experiences any traffic, regardless of type. At this heightened level, alert messages may be generated based on intruder activity within the cage environment even in cases where there is no information indicating that the cage has been compromised or is in risk of being compromised.

Finally, the menu heading "Advanced" in one embodiment provides options for customizing the file content for the virtual cage environment and for making more complex configuration changes, to accomplish such goals as optimizing system performance or to otherwise tailor the trap system to the specific needs of a particular user.

Referring further to FIG. 5, the administration console display 500 also includes a back button 508 and a next button 510 used to navigate back to the previous menu option or forward to the next menu option, respectively. The display 500 also includes a revert button 512 used to cancel a configuration change entered at the administration console and revert to the configuration settings that were in place prior to any changes being made. Display 500 also includes an update button 514 used to update a file maintained locally at the administration console to store configuration changes entered at the administration console but not yet applied to the trap host system. Display 500 also includes an apply button 516 used to apply configuration changes entered at the administration console to the trap host system. Finally, display 500 includes a reboot button 518, which causes the trap host system to reboot. In one embodiment, it is necessary to reboot the trap host system in order for configuration changes to be implemented in the trap host system.

Figure 6:
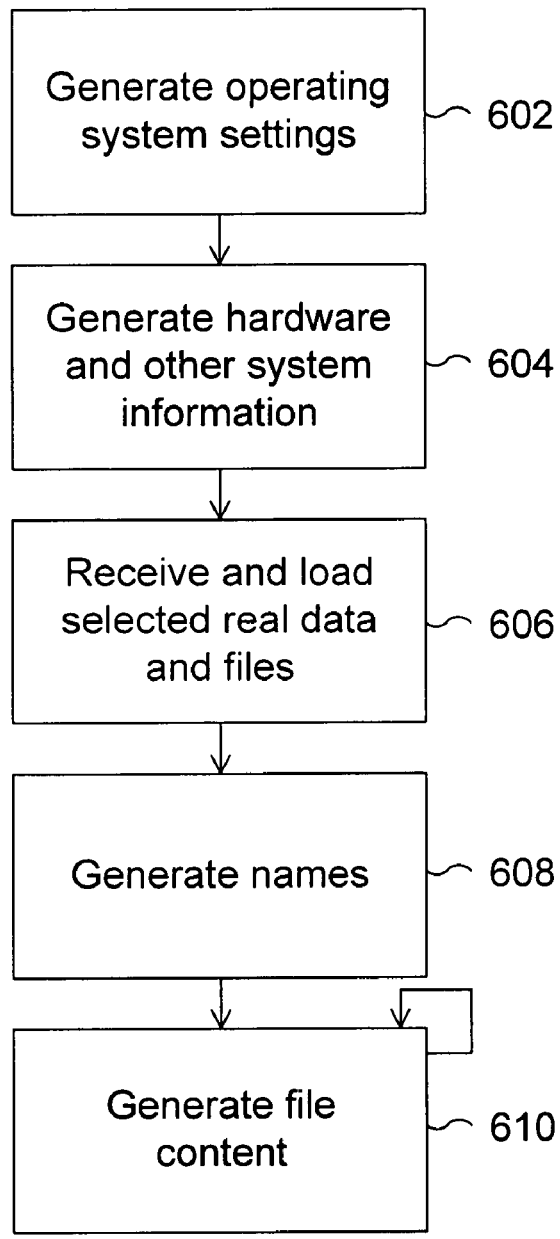
FIG. 6 is a flowchart illustrating a process used in one embodiment to generate file content for the trap, as required, e.g., in step 304 of FIG. 3.

FIG. 6 is a flowchart illustrating a process used in one embodiment to generate file content for the trap, as required, e.g., in step 304 of FIG. 3. The process begins with step 602 in which operating system settings are generated automatically for the operating system installed in the trap host system. Operating system settings are generated automatically, with random variations included, to avoid having the same operating system configuration for each trap system. If such variations were not introduced, would-be intruders might be able to recognize that a system is a trap system provided by a particular manufacturer based on the presence of a standard operating system configuration used by the manufacturer.

Next, in step 604, information is generated automatically concerning the hardware installed on the trap host system, the configuration of such hardware, and other information concerning the configuration of the trap host system.

The process continues with step 606 in which selected real data and files are received and loaded. Any selected real files to be made available in the trap system, such as publicly-available documents or information, are stored in the file system or the trap host system. Real data to be used to fill in document templates, such as the names of key employees or other publicly-known individuals, are stored in the applicable database.

Then, in step 608, a database of fictitious names to be used in automatically generated e-mail and other documents is generated. A unique key or serial number provided with each copy of the software for the trap system serves in one embodiment as the seed for a pseudo random number generator. Numbers from the pseudo random number generator are used in conjunction with probabilistic data concerning the occurrence of first and last names from a database of names to generate a list of fictitious user names to be used to generate file content for a particular trap system.

The process continues with step 610 in which fictitious file content, such as fictitious e-mail, word processing document, spreadsheet, and other file content, is generated. In one embodiment, e-mail and other document templates are provided which require data values such as dates, names, product names, and other types of information to be inserted. Random numbers from a pseudo random number generator and probabilistic data are used to select a set of file templates to be used for the file content of a particular trap system. The set of templates to be used for any given system will be unique because the pseudo random number generator uses the unique product serial number or key for each particular system as the seed for the pseudo random number generator. Once the set of templates has been selected, the data values for each of the inputs required by each template are provided by using the pseudo random number generator and probabilistic data to select values from various databases of possible values provided for each type of input required by the templates.

An exemplary e-mail template used in one embodiment for generating an e-mail message announcing a meeting for a project identified by a code name follows:

&MEETING: 10
To: @EMPLOYEE
Subject: Meeting re @PROJECT
The meeting re @PROJECT will take place on @DAY, @MONTH @1TO28, at @TIME. The meeting will be held in @NAME=1's office. Coffee and rolls will be served. Please RSVP to @NAME=2 NLT (@DAY-1).

In the above exemplary template, the entry "&MEETING: 10" indicates that the template is a meeting announcement template with a relative probability of occurrence of 10. The relative probability of occurrence is a weight value for the template, which is based on studies of actual file systems found in a typical network server. The sum of all of the relative probability values for all templates appears at the top of the template file, and the relative likelihood that the above particular template will be selected at random from among the entire body of templates is determined by dividing the weight for the template, 10, by the sum of all of the weights. For example, if the sum of all of the weights were 1,000, the probability of the above template being selected would be 10/1,000. By comparison, a product launch announcement template might have a weight of only 1. The probability of such a template being selected would be 1/1,000, or about one tenth that of the above template. This would indicate that a product launch announcement e-mail would be one tenth as likely as a meeting announcement e-mail to be found in a typical network server. As described above, in one embodiment the selection of a set of templates for the initial file content for the trap file system would be based on the probability weight values and numbers generated by a pseudo random number generator.

The values of the variables @EMPLOYEE, @PROJECT, @DAY, @MONTH, @1TO28, @TIME, @NAME=1, and @NAME=2 in the above exemplary template are selected in one embodiment from corresponding files comprising possible values and a corresponding probability weight for each possible value. A number generated by a pseudo random number generator is used, in combination with the probability weights, to select the specific value for a particular instance. For example, the value of the variable @EMPLOYEE is selected at random from a file comprising names of fictitious employees and associated data, such as network usernames, e-mail addresses, and host system identification information. In one embodiment, the variable @EMPLOYEE is replaced with the e-mail address of from one to ten fictitious employees (and other information required for a file comprising an e-mail to the employee(s)), with the precise number of recipients being determined at random. In a similar manner, a day of the week would be selected as the value of the variable @DAY, a month for the variable MONTH, a number from 1 to 28 for the variable 1TO28, and a time (e.g., at half hour increments during business hours) for the variable @TIME, would be chosen at random from corresponding files of possible values.

A similar technique may be used to select values for the variables @NAME=1 and @NAME=2 from a file containing the fictitious user names, created as described above. The annotations "=1" and "=2" indicate that a different name should be selected for each variable.

For certain types of variables, probabilities of occurrence would be considered in one embodiment in selecting the value. For example, the value for the variable @PROJECT is selected in one embodiment from a file such as the following:

@PROJECT: 90
10: SPEAR
20: WIN
20: SPEED
10: NORMANDY
10: STORM
20: VICTORY

In the above file, the entry "@PROJECT: 90" identifies the files as containing possible values for the variable @PROJECT and indicates the sum of the probability weights for the possible values is 90. (In one embodiment, if the relative probability of occurrence of each value were the same, the number after the colon would be the total number of possible values in the file and the relative weight of each value would be assumed to be 1.) Each of the remaining entries in the file comprises a probability weight followed by a possible value. For example, the entry "10: SPEAR" has a probability weight of 10 and a value of "SPEAR". The weight indicates the value SPEAR has a 10 in 90 (i.e., one in nine) probability of occurrence. The value chosen for a particular instance of a template is selected using a number generated by a pseudo random number generator and the probabilistic data.

In one embodiment, spelling, grammatical, and typographical errors are introduced into at least certain portions of the generated file content. Probabilistic data concerning the occurrence of such errors and a pseudo random number generator are used to determine the nature and location of the errors that are introduced.

In one embodiment, additional file content is generated, in the manner described above, at random intervals after the initial set of file content has been generated. In one embodiment, a pseudo random number generator is used to determine the intervals at which additional file content is generated. In one embodiment, file content is generated at more frequent intervals during certain times of the day, such as business hours, than during other times of the day. Additional file content is generated over time in order to provide a more realistic deception environment. For example, if an intruder accesses the trap system on one occasion and later returns to access the trap system in the future, the intruder may become suspicious if no additional file content has been generated in the file system since the initial attack. In addition, even if an intruder only accesses the file system on one occasion, the intruder may become suspicious if the system has been installed for a considerable period of time and no additional file content has been generated since the time of installation.

Figure 7:
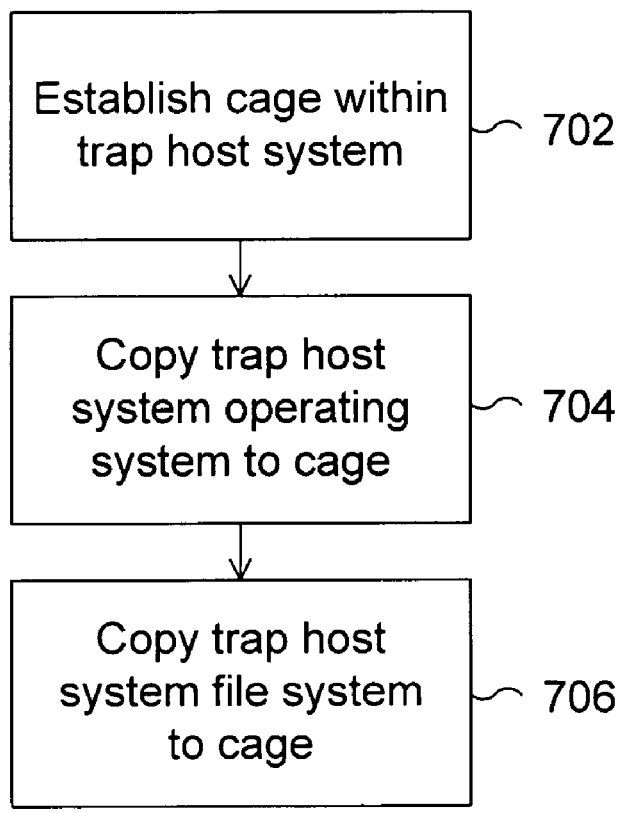
FIG. 7 is a flowchart illustrating a process used in one embodiment to set the trap, as in step 306 of FIG. 3.

FIG. 7 is a flowchart illustrating a process used in one embodiment to set the trap, as in step 306 of FIG. 3. The process begins with step 702 in which a cage is established within the trap host system. In one embodiment, this is accomplished by creating within the file system of the trap host system a new directory to contain the file structure for the cage.

In step 704, the operating system of the trap host system is copied into the cage directory. As described more fully below, the interface to the operating system kernel is modified to monitor the intruder's actions (e.g., by generating log data regarding an intruders activities), keep the intruder in the cage, and prevent the intruder from detecting that the intruder is in the cage. The files and programs that perform these latter functions are not copied into the cage. In step 706, the file system of the trap host system is copied into the cage directory.

By copying the operating system of the trap host system and the file system of the trap host system into the cage directory, it becomes easier to route an intruder into the cage directory and present to the intruder a deception environment that leads the intruder to believe that the intruder has successfully gained access to the operating system and file system of the computer the intruder is targeting. From time to time, additional file content is generated and added to the copy of the file system in the cage directory, as described above, to provide a more realistic deception environment.

Figure 8:
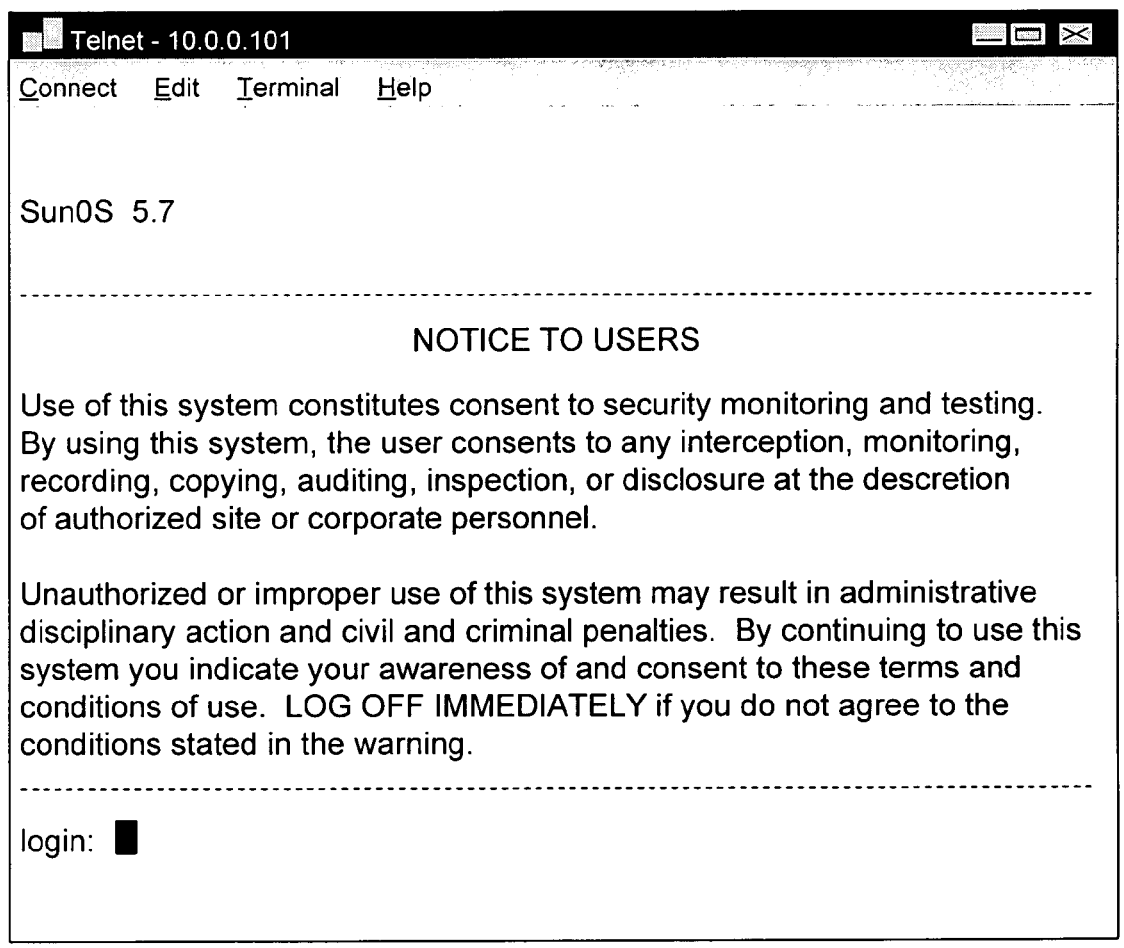
FIG. 8 is an illustration of a deception login screen 800 used in one embodiment to prompt an intruder who has been routed into the cage directory of the trap system to enter a login name.

Once an intruder has been detected and routed into the cage directory of the trap host system, a deception environment is presented to the intruder. The intruder interacts with the instance of the operating system running in the virtual cage environment. FIG. 8 is an illustration of a deception login screen 800 used in one embodiment to prompt an intruder who has been routed into the cage directory of the trap system to enter a login name. In one embodiment, the trap host system is configured to make it relatively easy for an intruder to obtain a login or user name and the corresponding password that will enable the intruder to gain access to the trap system using well-known hacking techniques.

Figure 9:
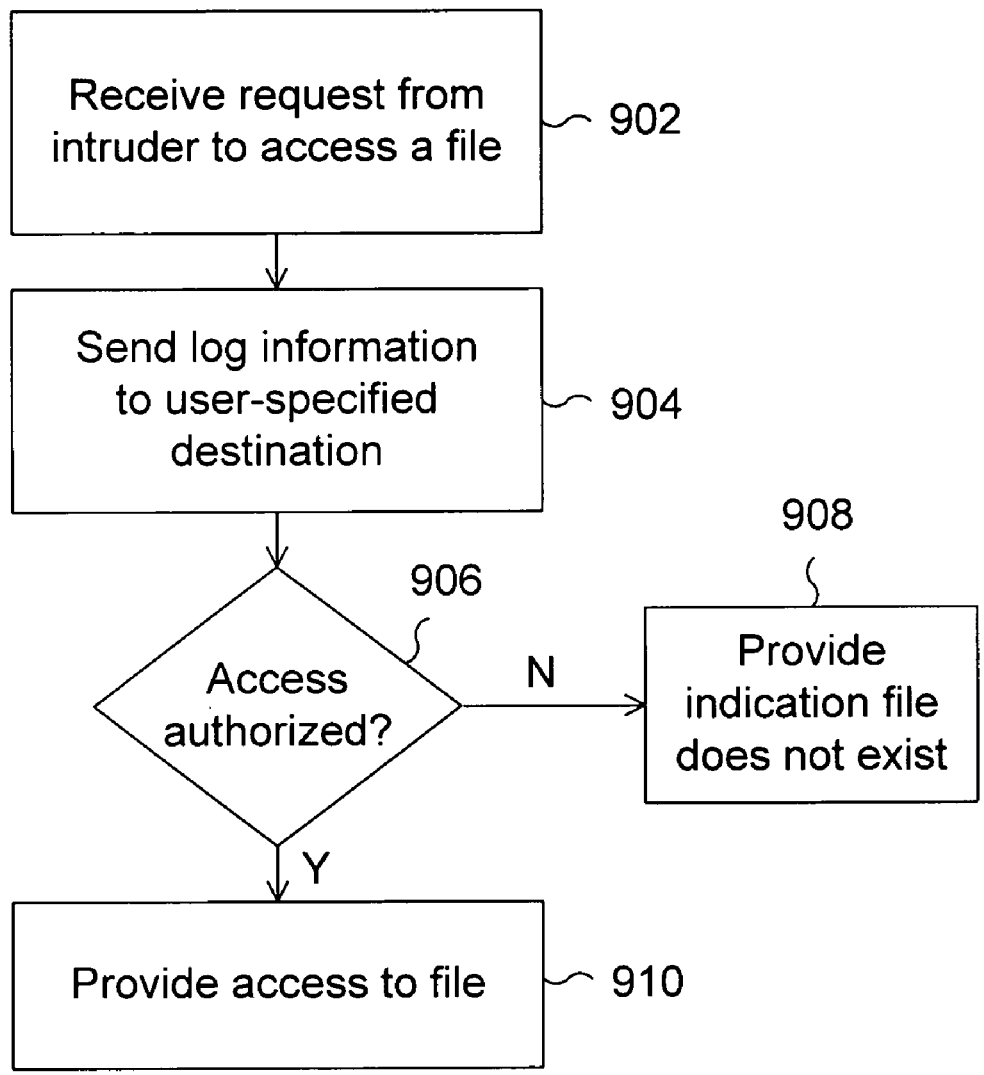
FIG. 9 is a flowchart illustrating a process used in one embodiment to keep an intruder in the trap, as in step 312 of FIG. 3.

FIG. 9 is a flowchart illustrating a process used in one embodiment to keep an intruder in the trap, as in step 312 of FIG. 3. The process begins with step 902 in which a request to access a file within the cage directory is received from the intruder. In one embodiment, a software module is provided to serve as a filter between requests made by an intruder to access a file, on the one hand, and the copy of the file system contained in the cage directory of the trap system, on the other hand. Such filtering software is used to prevent the intruder from accessing files that might enable the intruder to discover that the intruder is in a trap system, and not an actual system, as described more fully below.

In step 904, the filtering software sends log information to the user-specified destination for logging data concerning activities of intruders.

The process continues with step 906 in which it is determined whether the intruder is permitted to access the particular file the intruder has requested. In one embodiment, the filtering software referred to above, and described more fully below, makes this determination. If it is determined in step 906 that the intruder is not permitted to access the requested file, the process proceeds to step 908 in which an indication is provided to the intruder that the requested file does not exist. If it is determined in step 906 that the intruder is authorized to access the requested file, the process proceeds to step 910 in which the intruder is provided access to the copy of the requested file contained within the cage directory in the trap system.

Figure 10:
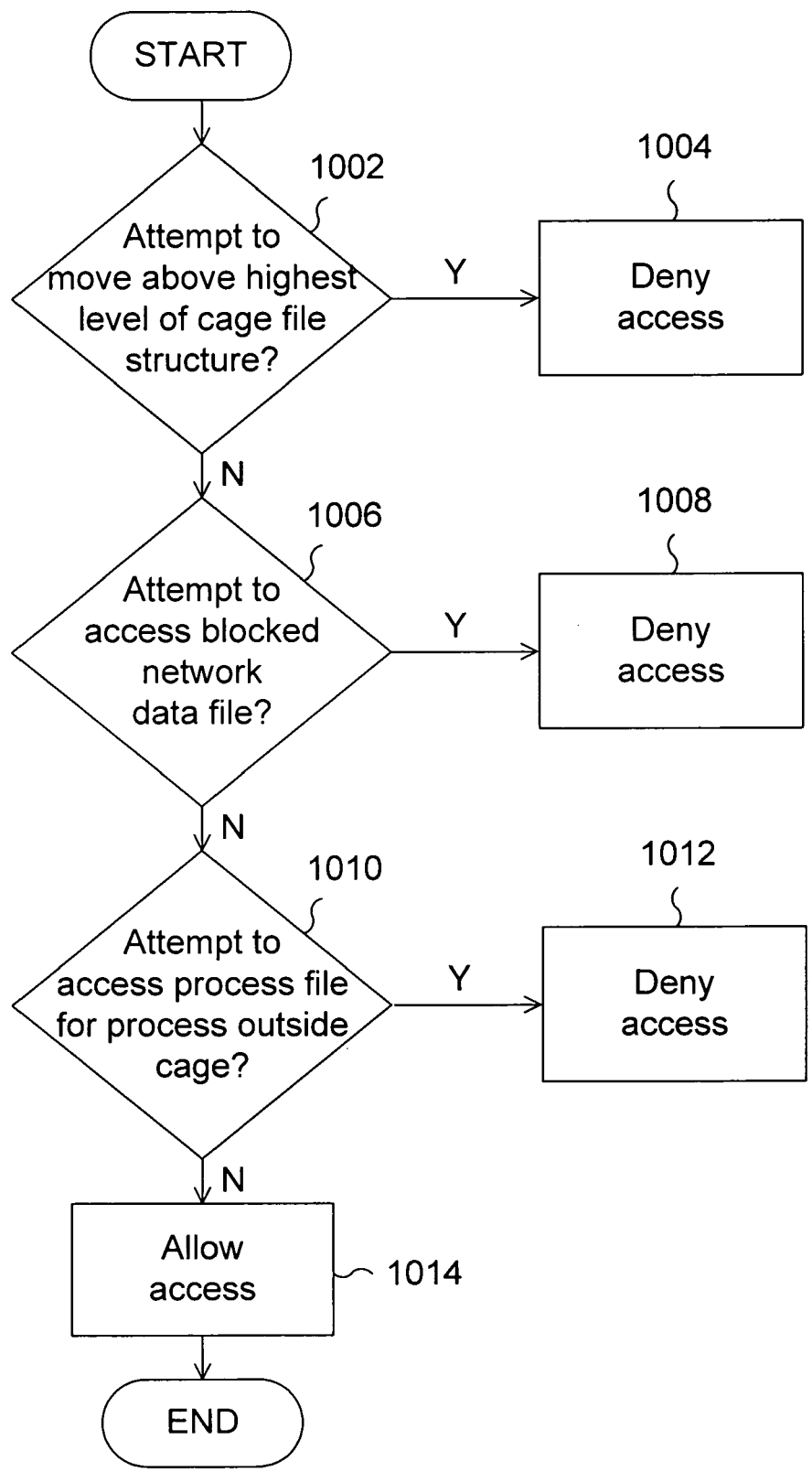
FIG. 10 is a flowchart illustrating a process used in one embodiment to determine whether access to a particular file requested by an intruder is permitted, as in step 906 of FIG. 9.

FIG. 10 is a flowchart illustrating a process used in one embodiment to determine whether access to a particular file requested by an intruder is permitted, as in step 906 of FIG. 9. The process begins at step 1002 in which it is determined whether the intruder is attempting to request a file that is at a level within the trap host system file structure that is above the highest level of the cage file structure, i.e., above the directory created to hold the file structure and operating system for the cage. For example, in one embodiment, the trap host system operating system is SOLARIS 7. In the SOLARIS 7 operating system, the command "/ . . . /proc", for example may be used to gain access to the directory level above the file "proc", which would normally be in the highest level of the file structure for a system such as the trap host system. If an intruder were able to use this command to move above the "proc" file in the cage directory (which is a copy of the proc file of the trap host system copied into the cage directory), the intruder likely would realize that the intruder has been contained within the cage directory and, once the intruder has broken out of the cage directory, the intruder is much more likely to be able to compromise the trap host system. In one embodiment, the "/ . . . /proc" command or similar commands that might be used to access a level of the trap host system file structure that is above the highest level of the cage file structure are filtered by a software module which recognizes such commands, prevents them from being executed, and provides an indication (as in step 1002) that an attempt is being made to move above the highest level of the cage file structure.

If it is determined in step 1002 that an attempt is being made to move above the highest level of the cage file structure, the process proceeds to step 1004 in which access to the requested file structure level is denied and an indication is provided to the intruder that the requested file does not exist, in accordance with step 908 of FIG. 9. If it is determined in step 1002 that an attempt is not being made to move above the highest level of the cage file structure, the process proceeds to step 1006 in which it is determined whether the intruder is making an attempt to access a blocked network data file. For example, in the SOLARIS 7 operating system, all network devices have a major and minor number associated with them. It is known in the art of computer security and the art of computer hacking that files associated with certain device numbers are susceptible to being used to gain unauthorized access to or control over a target computer system. For example, in one embodiment the trap host system uses the SOLARIS 7 operating system for which the device files for devices that have a major number 7 and a minor number in the range of 0–7, or devices that have a major number 11 and a minor number 7, may be exploited by an intruder to gain an unauthorized level of access to or control over a target computer system. As a result, in one embodiment, it is determined in step 1006 whether the intruder is attempting to access the device files associated with a device having a major and minor number in one of the ranges listed above.

If it is determined in step 1006 that an attempt is being made to access a blocked network data file, the process proceeds to step 1008 in which access to the requested file is denied, and an indication is provided that the file does not exist in accordance with step 908 of FIG. 9. If it is determined in step 1006 that an attempt to access a blocked network data file is not being made, the process proceeds to step 1010 in which it is determined whether an attempt is being made to access a process file for a process running outside of the virtual cage environment. Each computer operating system provides a way to monitor the processes or tasks currently being performed by the host system. In the SOLARIS 7 operating system, for example, a process table is provided in a file contained within the operating system's virtual file system. The process table is accessed by entering a file name in the directory "/proc". In one embodiment, a software module is used to filter access to the "proc" file to limit an intruder's access to files associated with processes running within the cage environment and to prevent access to processes running on the trap host system outside of the virtual cage.

If it is determined in step 1010 that an attempt is being made to access a process file for a process running outside of the cage environment, the process of FIG. 10 proceeds to step 1012 in which access to the requested file is denied, and an indication is provided that the file does not exist in accordance with step 908 of FIG. 9. If it is determined in step 1010 that an attempt is not being made to access a process file for a process running outside of the cage environment, the process proceeds to step 1014 in which access to the requested file is permitted in accordance with step 910 of FIG. 9.

In one embodiment, at least one of the steps of the process illustrated in FIG. 10 is implemented by replacing one or more operating system functions in the system entry (or "sysent") table with a new program designed to perform the above-described filtering function. In one embodiment, the new program returns the output of the original operating system function if access to a requested file (or process) is permitted (i.e., the file or process is within the virtual cage) and returns an indication that the file (or process) does not exist, if the file (or process) is not inside the cage. In one embodiment, a similar approach is used to modify the function that responds to system calls such as "kill", in order to permit intruders to terminate only processes running inside the cage.

Figure 11A:
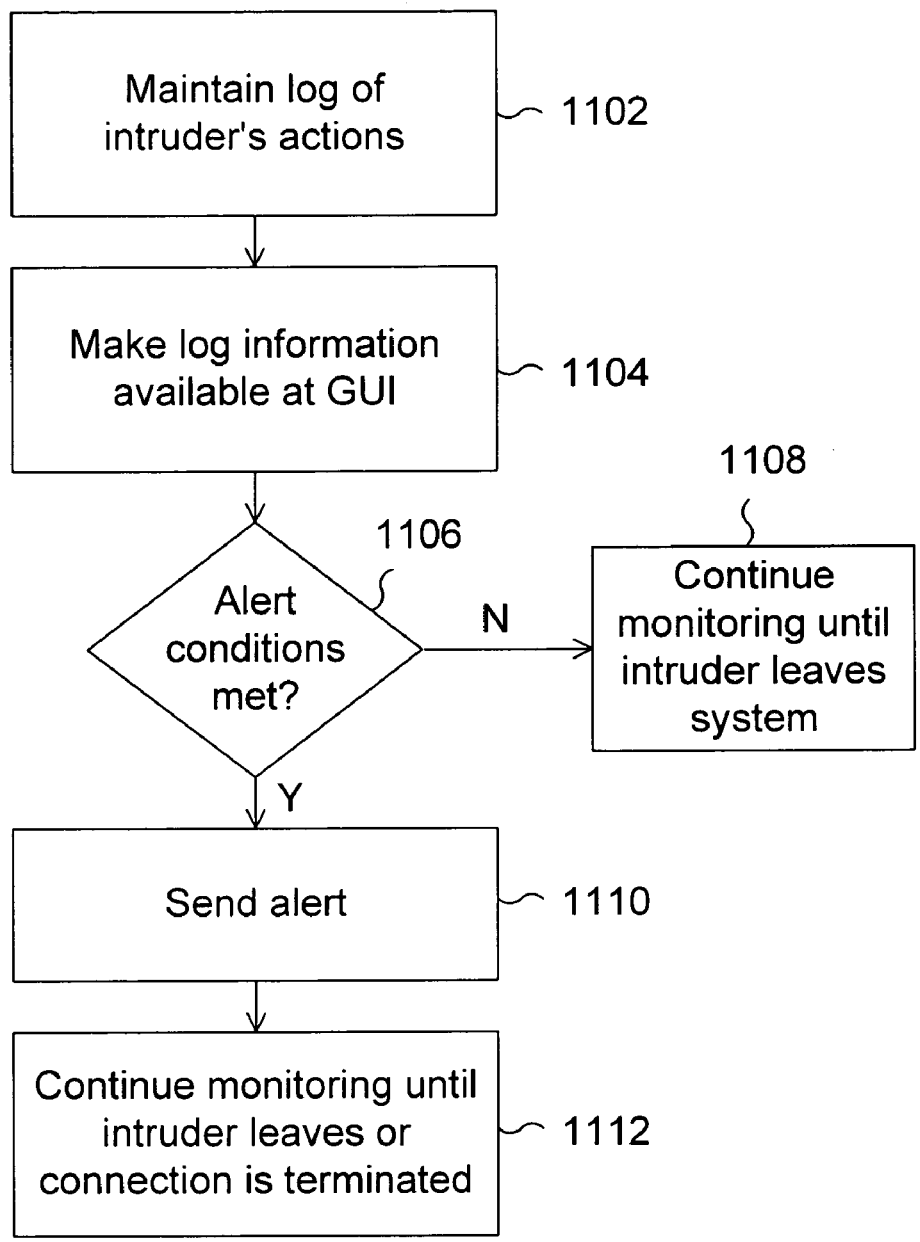
FIG. 11A is a flowchart illustrating a process used in one embodiment to monitor the activity of an intruder, as in step 314 of FIG. 3.

FIG. 11A is a flowchart illustrating a process used in one embodiment to monitor the activity of an intruder, as in step 314 of FIG. 3. The process begins at step 1102 in which a log of the intruder's actions is maintained. In one embodiment, the software modules used to filter requests to access various types of files send information concerning each request by the intruder to access a file to a log file used to store information concerning the files requested by an intruder. In one embodiment, the trap system can be configured to log either each command entered by an intruder or to log each keystroke entered by the intruder. In addition to information concerning the intruder's actions sent by the filtering software modules described above, information concerning the processes running within the virtual cage environment and what specific tasks each process is performing is available from the existing process file system (/proc) and is logged along with the log information derived from the filtering software modules.

As noted above, the intruder is prevented from becoming aware of the monitoring and logging processes by operation of the software module that filters the intruder's requests to access files within the process file system to prevent access to files relating to the monitoring and logging processes.

The process shown in FIG. 11A also includes a step 1104 in which log information is made available to the system administrator or other user of the trap system at a graphical user interface (GUI) presented at a control station such as administration console 216 of FIG. 2. This enables a system administrator or other user of the trap system either to perform an analysis of an intruder's actions subsequent to an attack or to monitor the actions of an intruder in real time, so as to be in a position, for example, to terminate the connection of the intruder to the trap host system if there is a risk the intruder may gain access to files outside of the virtual cage environment. In one embodiment, the connection of the administration console or other control system providing a graphical user interface for the trap system is hidden from detection by an intruder by use of a so-called "connectionless" port to provide for the exchange of information between the administration console and the trap host system, as described more fully below in connection with FIG. 11C.

The process illustrated in FIG. 11A also includes step 1106 in which it is determined whether the alert conditions established at the time the trap system was configured have been met. For example, in one embodiment, as described above, the "normal" level of alert conditions provides for the trap system to send an alert e-mail in a situation that indicates a possible security compromise, for example if multiple port connections are open, which may indicate that an intruder is attempting to determine which processes are currently running on the host system. As described above, a more sensitive level of alert may be established in which an alert e-mail message would be sent whenever the virtual cage environment experiences any activity, regardless of the type.

If it is determined in step 1106 that the alert conditions have not been met, the process proceeds to step 1108 in which the monitoring and logging of the intruder's activities continues until the intruder leaves the system. If it is determined in step 1106 that the alert conditions have been met, the process proceeds to step 1110 in which an alert is sent to the system administrator (or other designated user). In one embodiment, the alert is an e-mail message sent to the system administrator. In one embodiment, a subject line provided as part of the system configuration process is used to identify the nature of the message to an authorized individual who sees the subject line. If an alert has been sent in step 1110, the process continues with step 1112 in which the monitoring and logging of the intruder's activities continues either until the intruder voluntarily leaves the system or until the intruder's connection to the system is terminated by the system administrator, for example by regenerating the virtual cage environment, rebooting the trap host system, or changing the firewall rule set to no longer permit the intruder to access the trap host system.

The automatically logged information can be used to analyze the strategies and techniques used by the intruder to gain access to and attempt to gain control of the system. In one embodiment, another approach used to evaluate the activities of an intruder once an intruder has exited the system is to make a copy of the file system of the virtual cage environment and then to regenerate the virtual cage environment, as described above, and compare the regenerated virtual cage environment, which will not have any of the changes made by the intruder, with the copy of the virtual cage environment as modified by the activities of the intruder.

In one embodiment, a unique key is used to seed the pseudo random number generator used to generate content for the file system, as described above. In one embodiment, the key is the serial number of the copy of the trap software provided for a particular installation. Using a unique key to seed the pseudo random number generator ensures that the content of each trap system installed will be unique. The use of the same key to seed the pseudo random number generator each time the virtual cage environment for a particular installation is regenerated results in the same content being created each time the cage is regenerated. As a result, a returning intruder will see all of the same file content that was in the cage during the intruder's previous attack, even if the cage has been regenerated. If the changes made by the intruder during a prior attack were kept (i.e., the cage was not regenerated), the intruder will see the effects of the intruder's previous attack in the virtual cage environment. If the cage has been regenerated since a prior attack, the file system will contain the same file content the intruder saw during the previous attack, but will not contain changes made or caused by the intruder's activities. This is the same environment an intruder would expect to see if the system had been reconstructed, such as from back-up tapes. In either event, the intruder sees a sufficiently familiar environment the intruder likely will continue to be deceived.

Figure 11B:
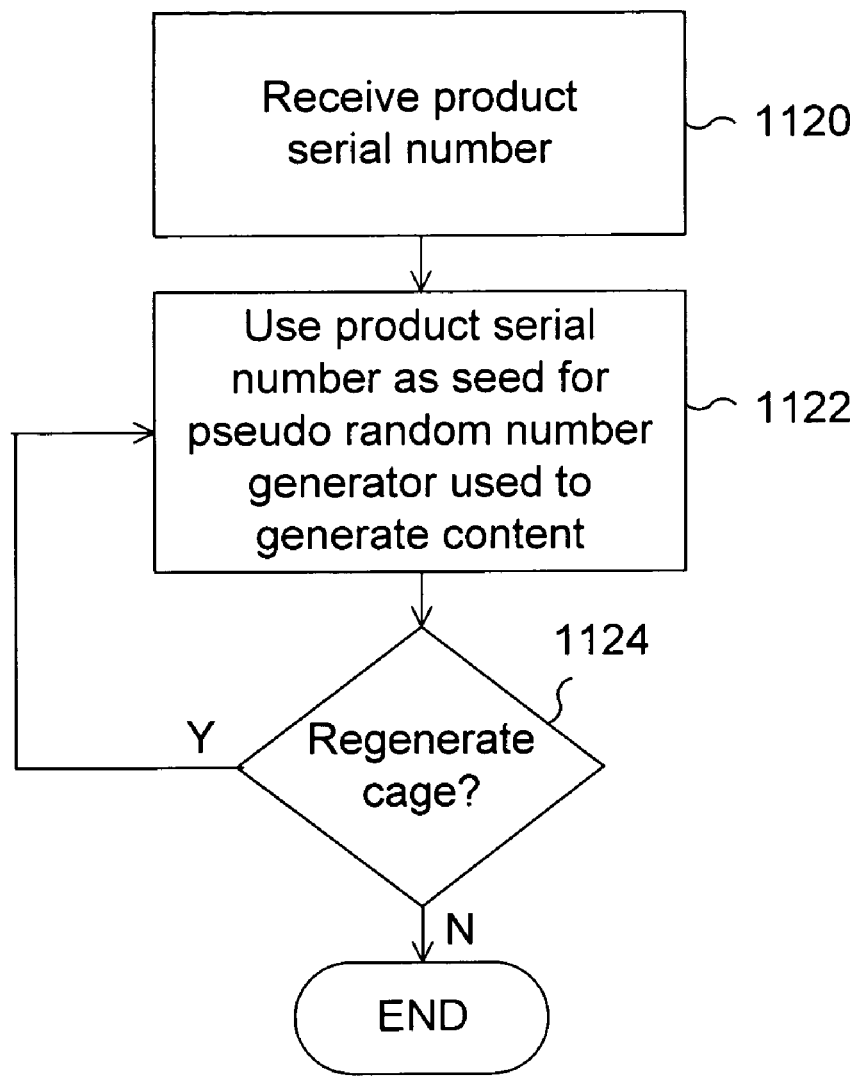
FIG. 11B is a flow chart illustrating a process used in one embodiment to regenerate a virtual cage environment by using a product serial number as the seed for a pseudo random number generator.

FIG. 11B is a flow chart illustrating a process used in one embodiment to regenerate a virtual cage environment by using a product serial number as the seed for a pseudo random number generator. The process begins with step 1120 in which a product serial number is received. In step 1122, the product serial number is used as the seed for a pseudo random number generator used to generate file content for the virtual cage environment, as described above. In step 1124, it is determined whether a command to regenerate the trap has been received. If a request to regenerate the trap has not been received, the process ends. If a request to regenerate the trap has been received, the process returns to step 1122 in which the product serial number is used once again as the seed for the pseudo random number generator used to generate file content for the virtual cage environment.

Figure 11C:
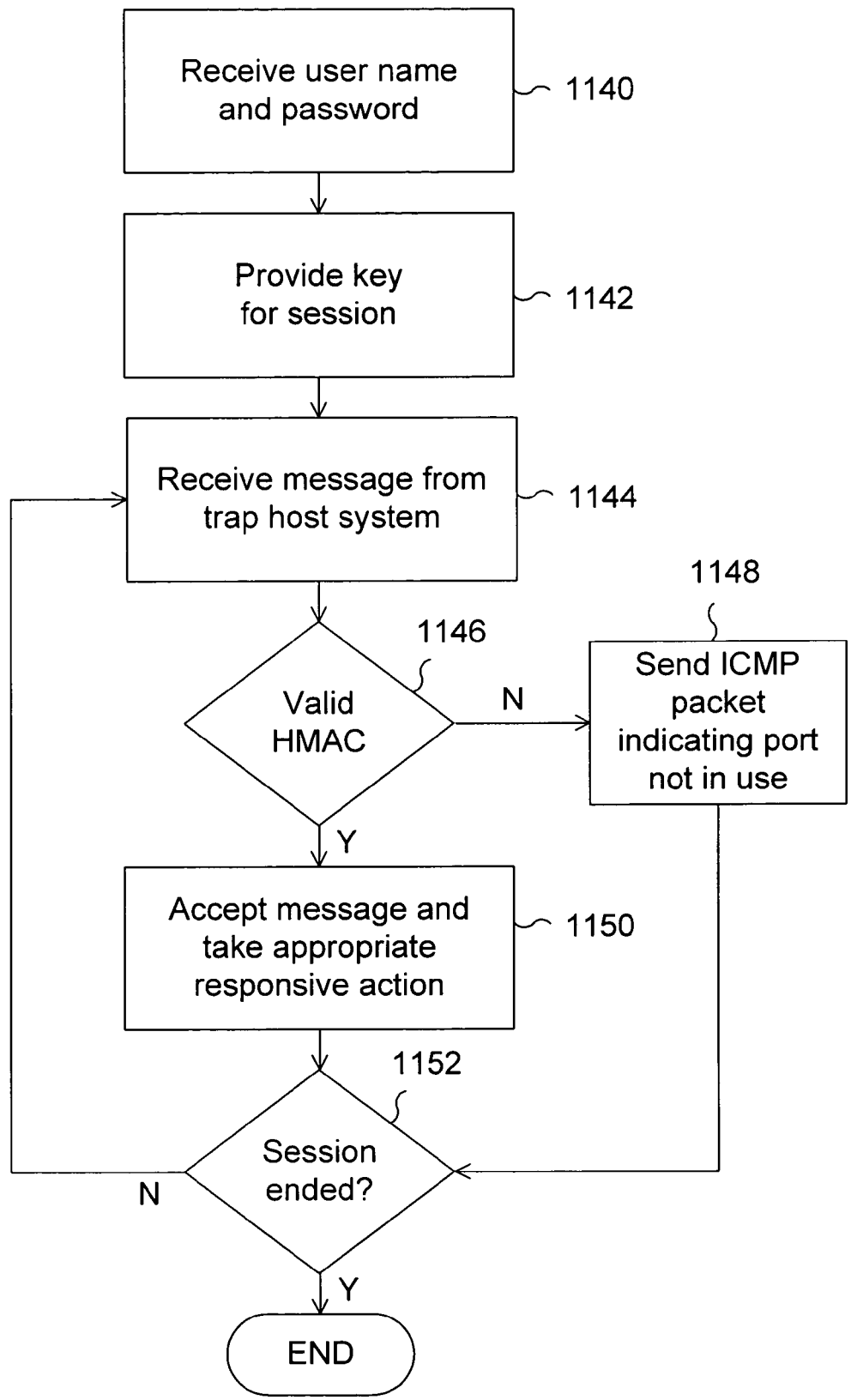
FIG. 11C is a flow chart illustrating a process used in one embodiment to hide the connection between the administrative console and the trap host system by using a "connectionless" port, as discussed above in connection with step 1104 of FIG. 11A.

FIG. 11C is a flow chart illustrating a process used in one embodiment to hide the connection between the administrative console and the trap host system by using a "connectionless" port, as discussed above in connection with step 1104 of FIG. 11A.

A typical way to connect such an administration console to a system such as the trap host system would be to use a connection that employs transmission control protocol (TCP), in which many packets of information are assembled together to appear as a uniform stream of information exchanged between the administration console and the trap host system. The shortcoming of this approach in the context of a system such as the trap system described herein is that an intruder would be able to see a connection that uses TCP as a continuously live connection to the trap host system. An intruder may become suspicious if the intruder can see that such a live connection exists.

In one embodiment, this shortcoming is avoided by employing a user datagram protocol (UDP) connection to connect the administration console to the trap host system. Unlike a TCP connection, a UDP connection does not result in many packets of data being assembled and transmitted as a uniform stream of information. Instead, each packet of information is sent with a hashed message authentication code (HMAC) used to identify the packet as having originated from an authorized source. Each packet is accepted at the receiving end if the required HMAC is present in the packet. In one embodiment, if the required HMAC is not present in a packet, the administration console replies with the Internet Control Message Protocol (ICMP) packet that would be sent if the port were not in use.

Unlike TCP, UDP does not require a communication channel to be established and maintained between the administration console and the trap host system in order for data to be exchanged between the two systems. When an authorized user logs into the administration console to view logging information, the user enters a password and the administration console generates a key that will be used to determine the HMAC that is required to be included in a valid transmission to the trap host system. Data packets sent by the trap host system to the administration console that contain the required HMAC will be accepted and acted on by the administration console system. If an intruder, on the other hand, sends a packet to the administration console via the UDP port in an attempt to determine if the trap host system is communicating with a device connected to the port (i.e., software is bound to the port), the administration console will see that the required HMAC is not present and will reply with the packet that would be sent if the port were not in use, as described above. As a result, the intruder will be led to believe that the port is not in use.

The process shown in FIG. 11C begins with step 1140, in which a user name and password are received at the administration console. In step 1142, a key for the session is provided. In one embodiment, the key is randomly generated. In one embodiment, the key is derived from the password. In step 1144, a message is received at the administration console via the connection to the trap host system. In step 1146, it is determined whether the incoming message contains the required HMAC.

If it is determined in step 1146 that the incoming message does not contain the required HMAC, the process proceeds to step 1148 in which the ICMP packet that would be provided if the port of the trap host system to which the administration console is connected were not in use is sent in response to the incoming message. If it is determined in step 1146 that the incoming message does contain the required HMAC, the process continues with step 1150, in which the incoming message is accepted by the administration console and the administration console takes appropriate responsive action, for example by responding to a command or query from the trap host system.

In step 1152, it is determined whether the session has ended, for example by determining whether the user has logged out of the administration console. If it is determined in step 1152 that the session has ended, the process ends. If it is determined in step 1152 that the session has not ended, the process returns to step 1144 in which the next incoming message, if any, is received.

Figure 12:
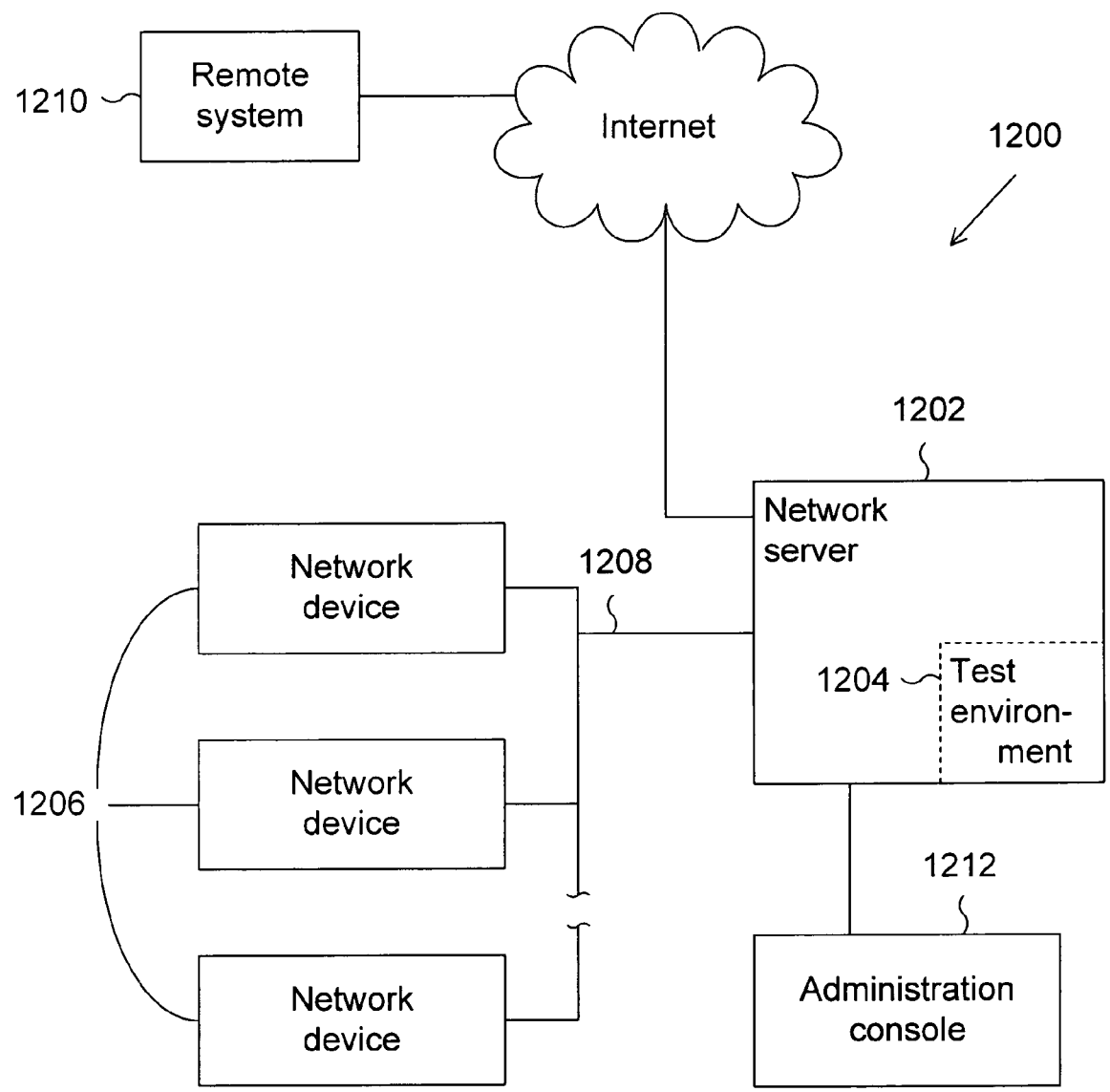
FIG. 12 is a schematic diagram of a system used in one embodiment to provide such a test environment.

In addition to providing computer security, the system and methods described herein may also be used for other purposes. For example, in one embodiment the techniques described above are used to provide a test environment to test the impact of a configuration change on a computer system without placing the actual files and data stored on the computer system at risk. FIG. 12 is a schematic diagram of a system used in one embodiment to provide such a test environment. The system 1200 includes a network server 1202 in which a virtual test environment 1204 is established in the same manner as the virtual cage environment described above. One or more network devices 1206 are connected to the network server 1202 by means of a network bus 1208. A remote system 1210 is configured to connect to network server 1202 by means of the Internet. An administration console 1212 is connected to the network server 1202 to be used to configure the network server and test environment, and to monitor activities in the test environment, similar to the administration console in the above-described security embodiment.

Figure 13:
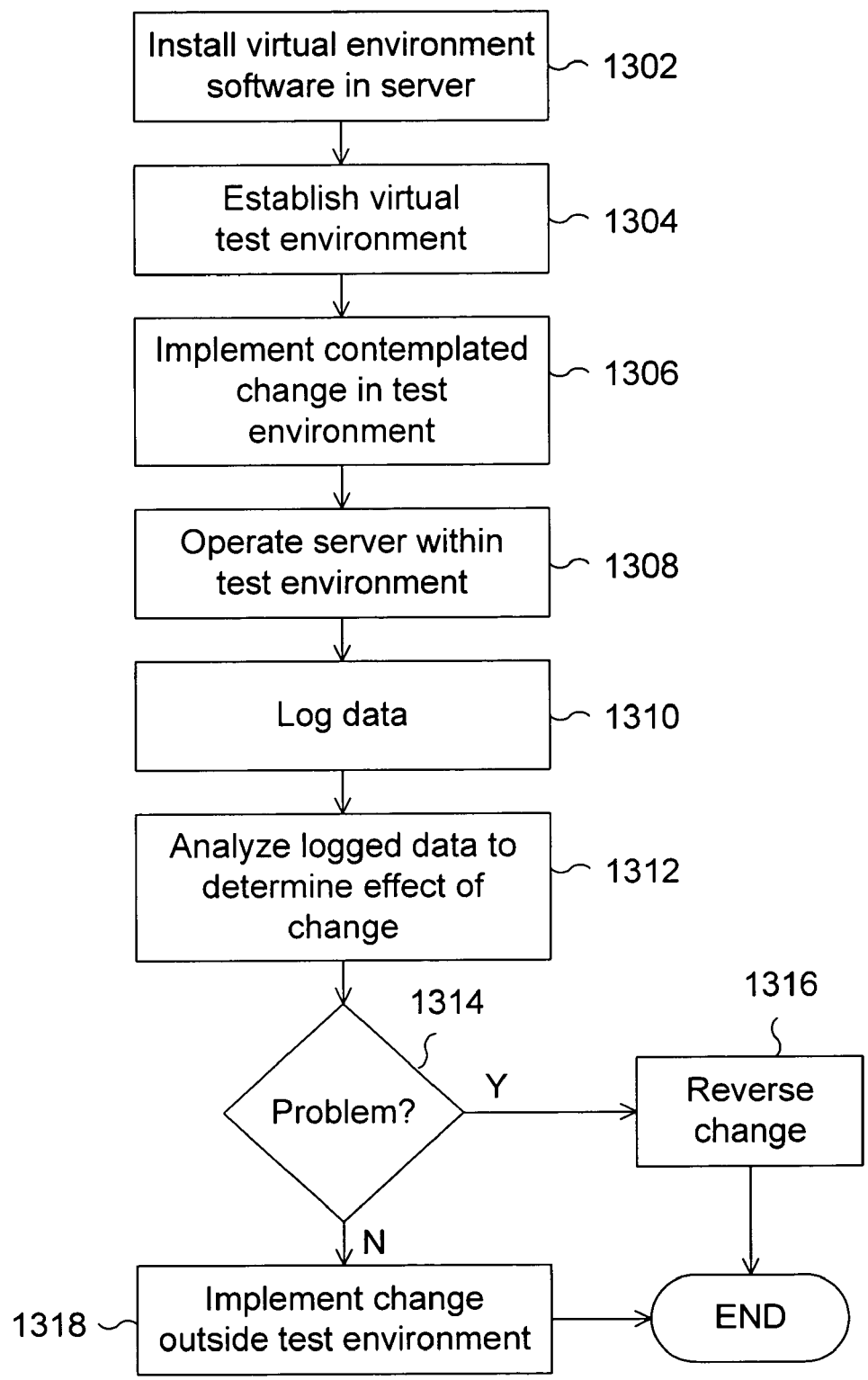
FIG. 13 is a flowchart illustrating a process used in one embodiment to provide a virtual test environment to test the effect of a configuration change prior to implementing the configuration change on the actual computer system.

FIG. 13 is a flowchart illustrating a process used in one embodiment to provide a virtual test environment to test the effect of a configuration change prior to implementing the configuration change on the actual computer system. The process begins with step 1302 in which the software for providing the virtual environment is installed in the server or other computer system in which the configuration change is to be made. Next, in step 1304, a virtual test environment is established in the same manner as described above for establishing a cage environment in the trap host system in a security embodiment. Specifically, a test environment directory is established and the network server operating system and file system are copied into the virtual test environment.

Then, in step 1306, the contemplated change in configuration of the network server is implemented only in the test environment. For example, the configuration change may be the installation of a new software application. Alternatively, the configuration change may be the installation of a new network device on the network bus, or the connection of a new remote system via the Internet or some other means of remote access to the network server.

Next, in step 1308, the server is operated with the configuration change having been implemented in the test environment.

In step 1310, data concerning the operations of the server within the test environment is logged. In one embodiment, data concerning the processes running on the server, and in particular processes running within the virtual test environment, is provided by the operating system kernel and sent to the administration console for storage in the database.

In step 1312, logged data is analyzed to determine the effect of the configuration change on the virtual test environment. In one embodiment, a copy of the virtual test environment is made and then the virtual test environment is regenerated to restore the virtual test environment to the condition it was in before the configuration change was made. Then, the copy of the virtual test environment as modified by the configuration change is compared to the regenerated virtual test environment to analyze all of the effects of the configuration change.

The process continues with step 1314 in which it is determined whether the configuration change created any problems in the configuration or operation of the server within the virtual test environment. If the configuration change did create a problem, the process proceeds to step 1316 in which the configuration change is reversed and the server is restored to the condition it was in prior to the configuration change. If it is determined in step 1314 that the configuration change did not result in any problem in the virtual test environment, the process proceeds to step 1318, in which the configuration change is implemented in the server outside of the virtual test environment and the server is operated normally with the configuration change implemented.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for providing security for a computer network, comprising:
   automatically generating content for a computer associated with the network;
   creating on the computer a deception environment comprising a fully functional operating system and the automatically generated content;
   determining automatically based on a preconfigured policy not specific to any user whether a user should be routed to the deception environment;
   routing the user to the deception environment if it is determined that the user should be routed to the deception environment;
   receiving an indication that the user is no longer connected to the computer; and
   determining whether to retain changes in the files of the computer that resulted from the user's activities.

2. The method of claim 1, further comprising monitoring the activities of the user with respect to the computer.

3. The method of claim 2, further comprising automatically preventing the user from accessing a file which if accessed would reveal to the user that an activity of the user is being monitored.

4. The method of claim 1 further comprising storing the packets sent by the user.

5. The method of claim 1 further comprising logging information concerning the files to which the user requests access.

6. The method of claim 1 further comprising preventing the user from accessing content within the computer other than the generated content.

7. The method of claim 1 further comprising screening a request by the user to access a file to determine if access is permitted.

8. The method of claim 7 further comprising permitting access to a requested file if it is determined that access to the requested file is permitted.

9. The method of claim 7 further comprising providing an indication that a requested file does not exist if it is determined that access is not permitted.

10. The method of claim 1 further comprising generating additional content subsequent to the step of generating content.

11. The method of claim 10 further comprising adding the additional content to the previously-generated content.

12. The method of claim 1 wherein the step of routing comprises using network address translation to route to the deception environment any user that requests to access an unauthorized service.

13. The method of claim 12 wherein the unauthorized service is telnet.

14. The method of claim 1 further comprising resetting the computer to restore the computer and the generated content to the condition they were in prior to the user being routed to the deception environment if it is determined the changes should not be retained.

15. The method of claim 1 further comprising updating the generated content by generating additional content that appears to have been created during the time period during which the user was connected to the computer.

16. A system for providing security for a computer network, comprising:
   a computer configured to:

automatically generate content for the computer, wherein the computer is associated with the network; and create on the computer a deception environment comprising a fully functional operating system and the automatically generated content; and a network device configured to:

determine automatically based on a preconfigured policy not specific to any user whether a user should be routed to the deception environment; and route the user to the deception environment if it is determined that the user should be routed to the deception environment;

receive an indication that the user is no longer connected to the computer; and determine whether to retain changes in the files of the computer that resulted from the user's activities.

17. The system of claim 16, wherein the network device is a firewall.

18. A computer program product for providing security for a computer network, the computer program product being embodied in a computer readable medium and comprising computer instructions for:

automatically generating content for a computer, wherein the computer is associated with the network;

creating on the computer a deception environment comprising a fully functional operating system and the automatically generated content;

determining automatically based on a preconfigured policy not specific to any user whether a user should be routed to the deception environment;

routing the user to the deception environment if it is determined that the user should be routed to the deception environment;

receiving an indication that the user is no longer connected to the computer; and determining whether to retain changes in the files of the computer that resulted from the user's activities.

* * * * *

UNITED STATES PATENT AND TRADEMARK OFFICE
CERTIFICATE OF CORRECTION

PATENT NO. : 6,981,155 B1  Page 1 of 1
APPLICATION NO. : 09/615967
DATED : December 27, 2005
INVENTOR(S) : Lyle et al.

It is certified that error appears in the above-identified patent and that said Letters Patent is hereby corrected as shown below:

Claim 18

Column 22, Line 3 & 4, delete ",wherein the computer is".

Signed and Sealed this

Sixteenth Day of December, 2008

JON W. DUDAS
*Director of the United States Patent and Trademark Office*